(12) United States Patent
Mayr et al.

(10) Patent No.: US 9,764,412 B2
(45) Date of Patent: Sep. 19, 2017

(54) HANDHELD WELDING TORCH FOR ELECTRIC-ARC WELDING

(71) Applicant: Fronius International GmbH, Pettenbach (AT)

(72) Inventors: Daniel Mayr, Kallham (AT); Christian Strumpfl, Wallern an der Trattnach (AT); Rudolf Brandstötter, Kirchham (AT); Walter Mitterhumer, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 186 days.

(21) Appl. No.: 14/483,323

(22) Filed: Sep. 11, 2014

(65) Prior Publication Data

US 2015/0069040 A1 Mar. 12, 2015

(30) Foreign Application Priority Data

Sep. 12, 2013 (AT) .............. A 50578/2013

(51) Int. Cl.
*B23K 9/28* (2006.01)
*B23K 9/12* (2006.01)
*B23K 9/133* (2006.01)
*B23K 9/29* (2006.01)

(52) U.S. Cl.
CPC ............ *B23K 9/28* (2013.01); *B23K 9/125* (2013.01); *B23K 9/1336* (2013.01); *B23K 9/295* (2013.01)

(58) Field of Classification Search
CPC .............. B23K 9/125; B23K 9/1336; B23K 9/28–9/282; B23K 9/295

USPC ............. 219/136, 137 R, 137.2–137.31, 219/137.44–137.71
See application file for complete search history.

(56) References Cited

U.S. PATENT DOCUMENTS 2,719,245 A   9/1955   Anderson
2,808,498 A * 10/1957  Hudson ............... B23K 9/295
                                              15/104.33
3,396,263 A * 8/1968   Even ..................... B23K 9/30
                                              219/125.12

(Continued)

FOREIGN PATENT DOCUMENTS

AT     413 662 B    4/2006
CN     1478630 A    3/2004

(Continued)

OTHER PUBLICATIONS

Austrian Office Action dated Mar. 24, 2014 in Austrian Application No. A 50578/2013.

(Continued)

*Primary Examiner* — Sang Y Paik
(74) *Attorney, Agent, or Firm* — Collard & Roe, P.C.

(57) ABSTRACT

A handheld welding torch for electric-arc welding with a melting welding wire has a wire feed unit for conveying the welding wire along a conveying axis arranged within a torch housing with a handle region, the wire feed unit including a drive unit with a rotation axis arranged vertically with respect to the conveying axis of the welding wire, a drive roller with a rotation axis and a counter roller with a rotation axis, and having a torch push-button. The wire feed unit has a gear stage and the rotation axis of the drive unit is arranged aligning with the conveying axis of the welding wire.

8 Claims, 4 Drawing Sheets

(56) References Cited

U.S. PATENT DOCUMENTS

| | | | |
|---|---|---|---|
| 3,693,858 A | | 9/1972 | Araya et al. |
| 3,738,555 A | | 6/1973 | Karnes et al. |
| 3,901,425 A | * | 8/1975 | Taylor .................. B23K 9/1336 226/108 |
| 5,326,958 A | | 7/1994 | Geus |
| 5,595,671 A | | 1/1997 | David |
| 5,839,642 A | * | 11/1998 | Tait ........................ B23K 3/063 228/41 |
| 7,165,707 B2 | | 1/2007 | Huismann et al. |
| 7,364,059 B2 | | 4/2008 | Huismann et al. |
| 7,384,255 B2 | * | 6/2008 | LaBossiere ......... B29C 67/0055 226/187 |
| 7,977,604 B2 | * | 7/2011 | Ertmer ................. B23K 9/1336 219/137.2 |
| 8,552,341 B2 | | 10/2013 | Zamuner |
| 8,642,922 B2 | | 2/2014 | Flattinger et al. |
| 2005/0236168 A1 | | 10/2005 | Lennartz |
| 2006/0070986 A1 | * | 4/2006 | Ihde ..................... B23K 9/1336 219/137.71 |
| 2006/0124622 A1 | | 6/2006 | Hubinger et al. |
| 2008/0217313 A1 | | 9/2008 | Huismann et al. |
| 2009/0200054 A1 | | 8/2009 | Lennartz |
| 2014/0097166 A1 | | 4/2014 | Flattinger et al. |

FOREIGN PATENT DOCUMENTS

| | | |
|---|---|---|
| CN | 1689763 A | 11/2005 |
| CN | 1816410 A | 8/2006 |
| CN | 1935439 A | 3/2007 |
| CN | 201807822 U | 4/2011 |
| CN | 201887637 U | 6/2011 |
| DE | 40 09 391 A1 | 9/1991 |
| DE | 20 2004 007 184 U1 | 7/2004 |

OTHER PUBLICATIONS

Chinese Office Action dated Dec. 2, 2015 in Chinese Application No. 201410458134.8 with English translation.

* cited by examiner

HANDHELD WELDING TORCH FOR ELECTRIC-ARC WELDING

CROSS REFERENCE TO RELATED APPLICATIONS

Applicant claims priority under 35 U.S.C. §119 of Austrian Application No. A 50578/2013 filed Sep. 12, 2013, the disclosure of which is incorporated by reference.

BACKGROUND OF THE INVENTION

1. Field of the Invention

The present invention relates to a handheld welding torch for electric-arc welding with a melting welding wire, having a wire feed unit for conveying the welding wire along a conveying axis arranged within a torch housing with a handle region, said wire feed unit including a drive unit with a rotation axis arranged vertically with respect to the conveying axis of the welding wire, a drive roller with a rotation axis and a counter roller with a rotation axis, and having a torch push-button.

2. Description of the Related Art

Basically, handheld welding torches having an integrated wire feed unit, called push-pull torches, are known from the prior art. A particular disadvantage of the known design variants is an unfavorable increase in weight, since constructional reasons lead to relatively large and heavy drive units being used. This increased weight of handheld welding torches having integrated wire feed units is a major disadvantage for the welder because it means that he has to handle a greater weight. Another aspect associated therewith is that the drive units currently in use are placed such that they exhibit an especially unfavorable distribution of weight. This is because the large and/or bulky drive units cannot be placed in a space-saving and ergonomically sensible manner. As a consequence, especially unfavorable ergonomic properties for handles are implemented and/or need to be implemented at the same time. The drive units currently in use cannot be integrated into standard welding torches since they consume too much space within the welding torch.

As a result, the only handheld welding torches currently available on the market exhibit these exact disadvantages. DE 40 09 391 A1, for example, describes a welding torch having a drive unit the axis of which is placed horizontally and transverse to the conveying axis of the welding wire. The transverse installation with respect to the conveying axis, however, requires much space so recesses and/or projections for the drive unit are needed in the housing of the welding torch. This makes handling and access even more difficult. By the same token, the unfavorable distribution of weight and the ergonomic properties of the handle are disadvantageous. Another disadvantage is that the bevel gears required here have poor performance, which has a considerable impact on thermal losses. This means that the poorer the performance is the higher thermal losses will be.

A further variant is described in AT 413 662 B. Here, the drive unit may be integrated into a robot welding torch or a handheld welding torch, with the handle of the welding torch being directed vertically downwards, similar to a pistol grip. The drive unit is integrated directly within the torch handle, which must necessarily be held by the user's hand. Substantially, the size of the torch handle is determined by the constructional size of the drive unit. A particular disadvantage that has been observed here is that the drive unit develops and subsequently releases heat, said heat being transferred directly to the torch handle and the hand of the welder, who necessarily holds the handle. In this type of design, this cannot be avoided since the drive unit and the torch handle form a single unit. Furthermore, the rotation axis of the drive is arranged aligning with the rotation axis of the drive roller, i.e. next to the conveying axis of the welding wire.

SUMMARY OF THE INVENTION

It is the object of the present invention to create a handheld welding torch having an integrated drive unit, the constructional size of which substantially corresponds to a handheld welding torch without an integrated drive unit and the handling of which is as favorable as possible. The disadvantages of the prior art are to be avoided.

The object according to the invention is achieved by a handheld welding torch in which the wire feed unit has a gear stage and the rotation axis of the drive unit is arranged aligning with the conveying axis of the welding wire. The gear stage acts substantially in the horizontal direction so the rotation of the drive unit arranged in the center may be transmitted to the offset drive roller. This arrangement of the components of the wire feed unit in the welding torch makes it possible to avoid disadvantages such as heavy weight, bad ergonomic properties, unfavorable development of heat and/or release of heat. Most importantly, however, the entire wire feed unit having an integrated drive unit may be integrated into a standard handheld welding torch.

Furthermore, it is advantageous according to the invention that in contrast to conventional systems no additional gear unit needs to be separately installed. Conventional systems are designed such that, as a basic principle, a drive unit, usually an internal rotor with a stationary external winding, is used. Next, their design requires flange-mounting a separate gear stage in order to obtain the desired transmission ratio, and subsequently the melting wire electrode is moved accordingly with the desired speed. The present invention allows a smaller design of handheld welding torches in contrast to the known large-volume torch housings of handheld welding torches having integrated wire feed units and thus allows a user-friendly and ergonomic construction. Such handheld welding torches having standard torch housings make it possible to reach long feeding distances of the welding wire of up to 10 m within the hose packages, for example, which has previously only been achievable using the large, heavy and bulky handheld welding torches.

Advantageously, the rotation axis of the drive roller and the rotation axis of the counter roller are arranged vertically with respect to the conveying axis of the welding wire.

Preferably, the wire feed unit is arranged outside of the handle region of the torch housing. In this type of design, the heat coming from the drive unit is not transferred directly to the handle region of the torch housing, which is held by the welder. The wire feed unit or at least most parts thereof are arranged upstream of the handle region of the welding torch, but theoretically they may also be arranged downstream of the handle region.

According to another feature the conveying axis of the welding wire is arranged above the drive unit and the torch push-button.

Advantageously, the drive unit is arranged between a front end of the torch housing and the torch push-button. This results in a space-saving arrangement within the handheld welding torch. Since the drive unit is arranged in a region outside the handle region of the torch housing of the handheld welding torch, which is not held by the hand of the welder, higher thermal stresses may act on the drive unit according to the invention. As a consequence, an increased output performance of the drive unit is possible. The handle region of the torch housing, which is held by the hand of the welder, is thus not heated a lot, and the maximum temperature in this region as defined by a standard is not exceeded.

Ideal spatial conditions are achieved by arranging the rotation axis of the drive roller and the rotation axis of the counter roller laterally offset, seen in the direction of the conveying axis of the welding wire, and by arranging the rotation axis of the counter roller and the rotation axis of the drive unit in a triangle located symmetrically with respect to the conveying axis of the welding wire.

A space-saving construction is achieved by designing the drive unit, the rotation axis of the drive roller and the gear stage as a joint unit. Such an integrated type of design requires no additional space or only slightly more space for the gear stage, and the components of the wire feed unit may thus be accommodated within a standard housing of a handheld welding torch. Such a space-saving integration of the wire feed unit within the torch housing results in favorable ergonomic properties of the handheld welding torch not present in previous welding torches having the unfavorable elevations that have been described. As a consequence, such elevations, which are obstructive for the welder and inconvenient for handling, may be omitted in the handheld welding torch of the present type. The perfect handheld welding torch for the welder is one that has a weight as low as possible, is handy, does not have obstructive elevations and is ergonomically well-shaped to fit the hand comfortably, all at the same time. Such an ergonomically favorable implementation is possible only if the welder can hold the handle of the torch in his hand without being impeded by obstructive elevations or the like.

Preferably, the gear stage is designed as a two-staged spur gear.

Preferably, the drive unit is designed as a brushless external-rotor motor. Because of its type of construction, an external rotor is of small size and thus consumes little space. Here it should be noted that the width of the handle shell of the handheld welding torch is substantially defined by the diameter of the external rotor. It is an electric motor having a stationary winding inside and rotating magnets that rotate on the outside. According to the invention, detecting the speed of this motor is done by means of Hall speed sensors. They are arranged on the stator and make use of the magnets of the rotor, so the speed is known for regulation. As a consequence, no additional space is required for detecting the speed. In contrast to this, a dedicated encoder is required in the prior art. As has been already mentioned above, a special characteristic of this type of construction is that little space is required for installation. The opposite are so-called internal rotors. This type of construction usually comprises DC motors. They are designed such that stationary magnets are located on the outside and a rotating winding is arranged inside. Alternatively, brushless internal rotors may also be used, with the winding being located within the stator and the magnets rotating inside. A problem with both these types is that this design requires relatively much space. As a result, such an internal rotor makes it impossible to implement the advantages according to the invention as described herein. The use of an external rotor as well as the special arrangement between the front end of the torch handle and the torch push-button are essential parts of the invention. In order to put into practice the effects according to the invention such as lower weight, miniaturisation or favorable ergonomic properties of the handle, a relatively small drive unit needs to be used and the individual components must be arranged in sophisticated fashion, since the advantageous effects can only be implemented by arranging the drive unit according to the invention.

Due to the combination of a small drive unit and gear stage a massive decrease in weight may be obtained. Using an external rotors thus allows a decrease in weight of up to 50% of the wire feed unit since the external rotor has a considerably low weight because of its especially small design. Of course this does not cause limitations for the wire conveying properties. Apart from the massive weight advantage, using an external rotor has a further substantial advantage that may be exploited according to the invention. The magnets located circumferentially on the outside of the rotor do have a certain mass which is rotated and acts as a gyrating mass. This leads to a high overall mass moment of inertia, which helps eliminate wire conveying troubles and results in a consistent wire conveying speed. In case the welding wire remains stuck on the contact pipe, for example, the high mass moment of inertia might make it possible for the welding wire not to stop abruptly and remain stuck to the contact pipe, but to overcome this adhesive effect because of the gyrating mass so the conveying of the welding wire may continue. Due to the high gyrating mass, the force conveying the welding wire is consistently strong and overcomes the adhesive effect. When using an internal rotor having no such gyrating mass as a drive unit, this may not or hardly be prevented. This advantageous effect is particularly relevant with aluminium welding wires. Moreover, this effect will prevent the welding wire from buckling immediately after the push wire feeding. This favorable effect is enhanced by the external rotor's connection to the gear stage. In this case, the gear transmission acts as a booster.

When using internal rotors as drive units, an integration of the wire feed unit into a standard torch housing is not possible because of the larger construction. In known handheld welding torches, for example, additional lateral elevations in the torch housing (see the construction according to DE 40 09 391 A1, for example) or the arrangement of a pistol-type handle (according to AT 413 662 B, for example) are required in order to integrate the entire drive unit.

The present implementation is a particularly advantageous way because due to the use of a brushless external-rotor motor and its special arrangement, no obstructive elevations are present, in contrast to the currently used welding torches.

BRIEF DESCRIPTION OF THE DRAWINGS

The invention is discussed in more detail by means of the attached drawings, in which.

DETAILED DESCRIPTION OF PREFERRED EMBODIMENTS

Figure 1:
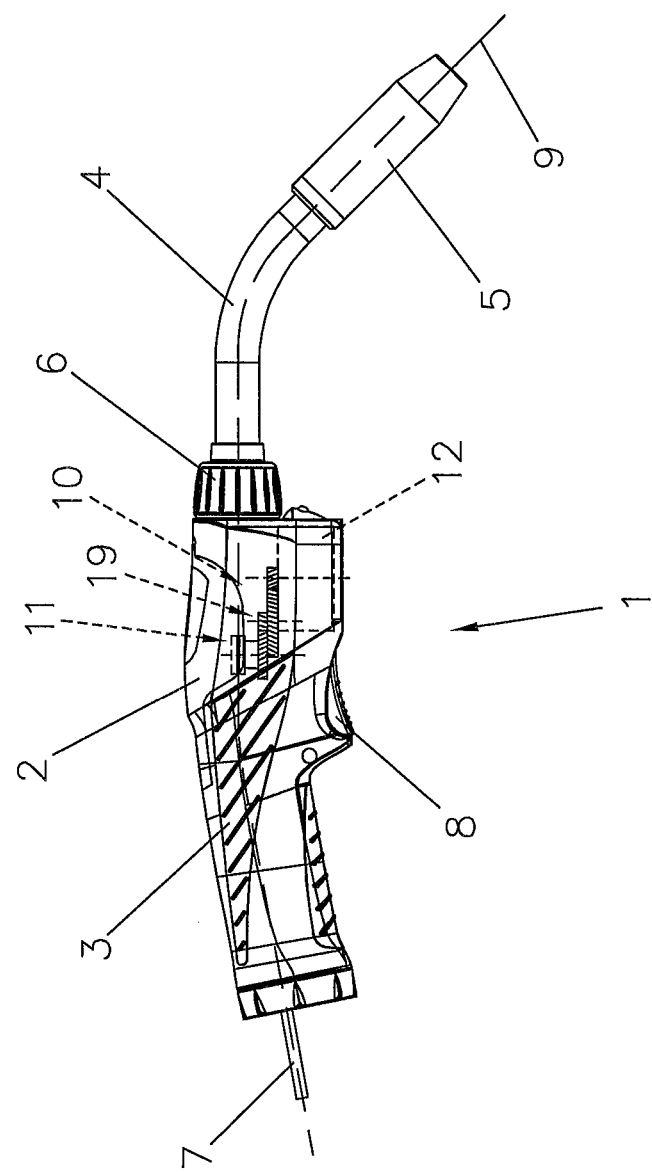
FIG. 1 shows a handheld welding torch with the arrangement of the drive unit according to the invention in a lateral view partly in section.

FIG. 1 shows a handheld welding torch 1 with the arrangement of the drive unit 12 according to the invention.

The handheld welding torch 1 has a torch housing 2 with a handle region 3. This is a standard handle shell, which does not have any unfavorable elevations or projections as they are common in the previously used handheld welding torches with integrated wire feed units. The pipe bend 4 and the gas nozzle 5 are screwed directly to the torch housing 2 by means of a screw connection 6. The melting welding wire 9 is guided into the torch housing 2 via a wire core 7, and further to the gas nozzle 5 via the pipe bend 4, before leaving the handheld welding torch 1 at this location. The welding wire 9 is driven by a wire feed unit 10 integrated in the torch housing 2, comprising a drive unit 12, a gear stage 19, a drive roller 14 having a rotation axis 17 and a counter roller 15 having a rotation axis 18. The drive roller 14 and the counter roller 15 form the conveying rollers 11.

The drive unit 12 is connected to a wire feed device, which is substantially placed near a welding device. The handheld welding torch 1 is connected to the welding device via a hose package. In a push-pull system the drive unit 12 contained in the torch housing 2 carries out the pull function, and the wire feed device in the welding device carries out the push function for conveying the welding wire 9. The control of the wire feeding is done by the welding device, with a torch push-button 8 being integrated into the control as well. The torch push-button 8 is arranged at the bottom of the torch housing 2 below the handle region 3. Upstream of the torch push-button 8, the drive unit 12 is arranged aligning with the torch push-button 8 in a receiving portion in the torch housing 2. In the illustrated exemplary embodiment of the handheld welding torch 1 the torch push-button 8 is pulled and/or pushed upward from the down position during actuation, so the actuation is done in a vertical direction with respect to the conveying direction 16 of the welding wire 9. At the same time, this direction of movement forms the reference for all following descriptions of positions for axes or the like. Accordingly, a vertically arranged axis is an axis that is arranged from top to bottom, provided the handheld welding torch 1 is held horizontally, i.e. the conveying direction 16 of the welding wire 9 is arranged horizontally. The rotation axis 13 of the drive unit 12 is arranged aligning with the conveying axis 16 of the welding wire 9, i.e. in the center of the handheld welding torch 1. The rotational movement of the rotation axis 13 of the drive unit 12 is transmitted to the rotation axis 17 of the drive roller 14 via the gear stage 19 acting in the horizontal direction.

Figure 2:
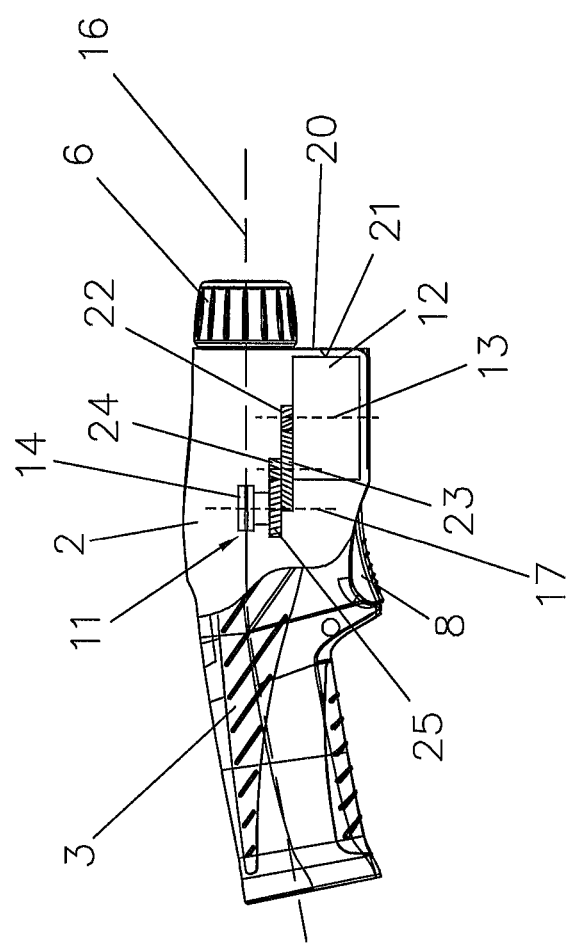
FIG. 2 shows the torch handle of the handheld welding torch according to FIG. 1 in a lateral view partly in section.

The arrangement of the wire feed unit 10 in the torch housing 2 of the handheld welding torch 1 can be seen in FIG. 2. The rotation axis 13 of the drive unit 12 as well as the rotation axis 17 of the drive roller 14 and the rotation axis 18 of the counter roller 15 are arranged vertically with respect to the conveying axis 16 of the welding wire 9. The rotation axis 13 of the drive unit 12 does not coincide with the rotation axis 17 of the drive roller 14 and/or the rotation axis 18 of the counter roller 15, which are arranged laterally offset from the conveying axis 16, i.e. to the left and to the right of the conveying axis 16, respectively. The side faces 21 of the drive unit 12 are arranged adjoining the front end 20 of the torch housing 2, i.e. upstream of the screw connection 6. This is relevant with respect to lower weight, miniaturisation and ergonomic properties of the handle. The drive unit 12 is arranged adjoining the torch push-button 8, between the front end 20 of the torch housing 2 and the torch push-button 8. Moreover, this special positioning allows to observe a substantial difference to the previously used systems, which have a horizontally arranged rotation axis 13 of the drive unit 12.

FIG. 2 also shows how the drive unit 12 and the gear stage 19 are arranged in a space-saving manner. Advantageously, a toothing 22 is arranged on the rotation axis 13 of the drive unit 12, which directly engages a first intermediate gear toothing 23 of an intermediate gear element. The intermediate gear element acts as an intermediate stage for the force transmission to the rotation axis 17 of the drive roller 14 by an intermediate gear toothing 24 of the intermediate gear element, which is arranged above the first intermediate gear toothing 23, engaging a drive roller toothing 25 of the rotation axis 17 of the drive roller 14, thus driving it with the desired speed and eventually conveying the welding wire 9. Here, it is particularly advantageous if the intermediate gear element is supported in the housing of the drive unit 12, so the space required may be minimized. The gear stage is a two-staged spur gear which has an exceptionally high degree of performance of above 90% due to the transmission ratio applied and/or the arrangement of the spur wheels (toothings 22 to 25) with respect to one another. The size and/or the diameter of the toothings 22 to 25 are adjusted to match the required speed of the drive roller 14.

Figure 3:
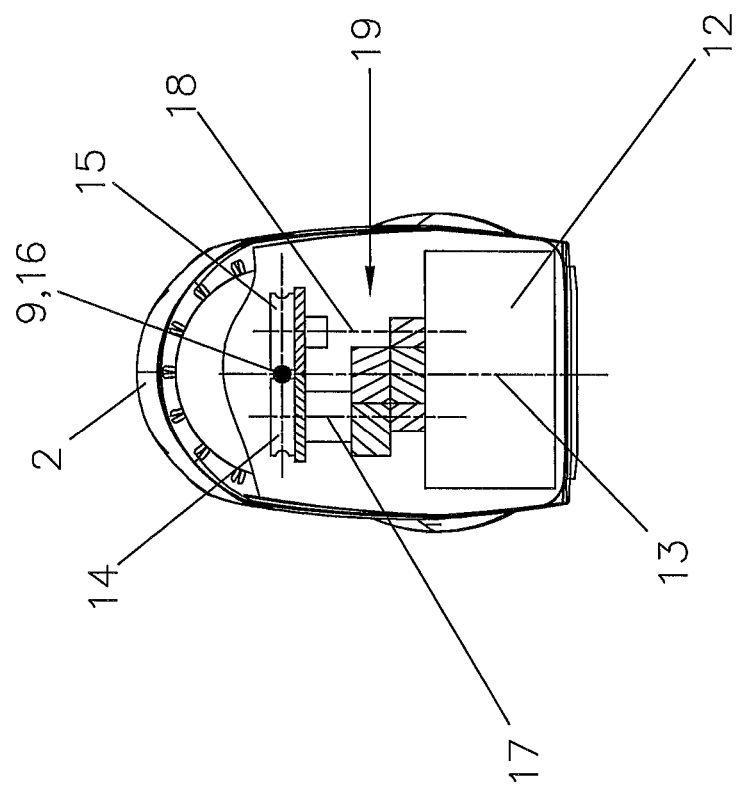
FIG. 3 shows the torch handle of the handheld welding torch according to FIG. 1 in a front view partly in section.

FIG. 3 shows the torch housing 2 of the handheld welding torch 1 according to FIG. 1 in a front view partly in section. Again, the vertical arrangements of the rotation axis 13 of the drive unit 12, the rotation axis 17 of the drive roller 14 and the rotation axis 18 of the counter roller 15 with respect to the conveying axis 16 of the welding wire 9 are clearly visible. The rotation axis 13 of the drive unit 12 is arranged aligning with the conveying axis 16, whereas the rotation axis 17 of the drive roller 14 and the rotation axis 18 of the counter roller 15 are arranged laterally offset from the conveying axis 16 to the left and to the right, respectively. This results in a central arrangement of the wire feed unit 10 in the torch housing 2 of the handheld welding torch 1. The rotation axis 17 of the drive roller 14 and the rotation axis 18 of the counter roller 15 are arranged parallel to, but spatially offset from the rotation axis 13 of the drive unit 12.

Figure 4:
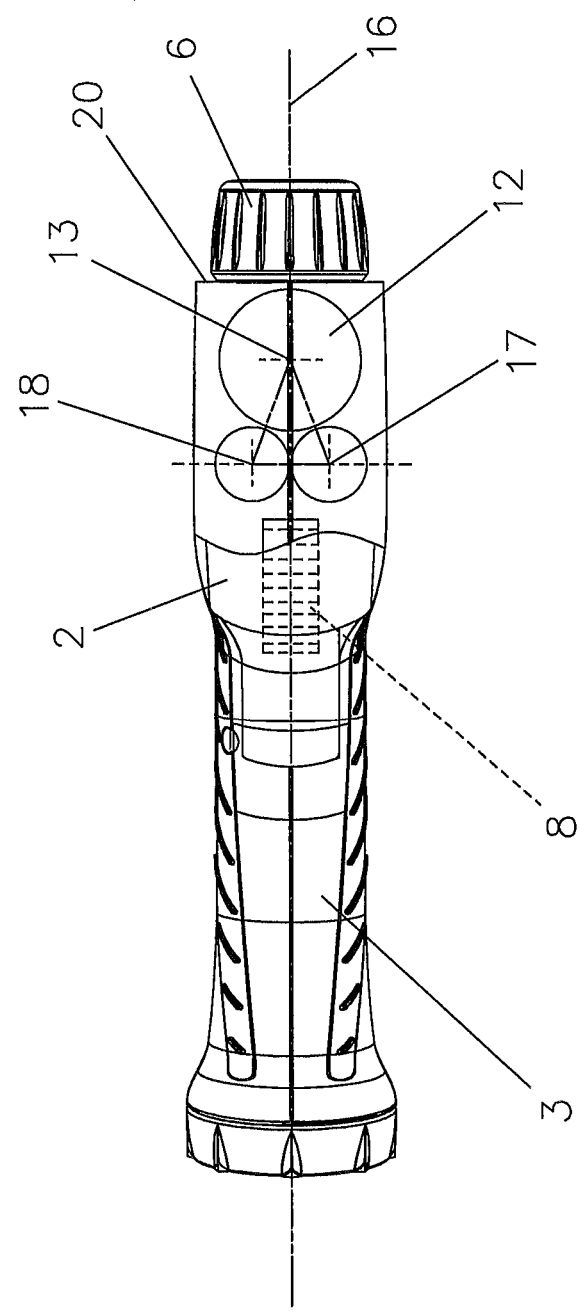
FIG. 4 shows the torch handle of the handheld welding torch according to FIG. 1 in a plan view partly in section.

FIG. 4 shows the torch housing 2 of the handheld welding torch 1 according to FIG. 1 in a plan view partly in section. The rotation axis 13 of the drive unit 12 and the rotation axes 17 and 18 of the drive roller 14 and the counter roller 15 are placed in a triangle located symmetrically with respect to the conveying axis 16. This arrangement is essential, since it is required to implement the arrangement of the wire feed unit 10 in a standard handle shell of a handheld welding torch 1. The shape of the triangle is designed such that, starting from the rotation axis 13 of the drive unit 12, which forms the front vertex of the triangle and is arranged directly downstream of the screw connection 6, the rotation axis 17 of the drive roller 14 and the rotation axis 18 of the counter roller 15 are placed in the direction of the back end of the torch housing 2. The torch push-button 8, which encloses the wire feed unit 10 on one side, is arranged directly adjoining the rotation axes 17, 18 of the drive roller 14 and the counter roller 15. The torch push-button 8 is arranged aligning with the rotation axis 13 of the drive unit 12 and the horizontally arranged conveying axis 16 of the welding wire 9, which is located above it. This means that the entire wire feed unit 10 is arranged between the torch push-button 8 and the front end 20 of the torch housing 2. As a consequence, the handle region 3 of the torch housing 2 heats up only slightly due to the heat created by the drive unit 12, since both the torch push-button 8 and the conveying rollers 11 are arranged therebetween. This does at least reduce a temperature rise in the handle region 3 of the handheld welding torch 1, so the handling by the welder is not compromised.

What is claimed is:

1. A handheld welding torch for electric-arc welding with a melting welding wire, the handheld welding torch comprising:
   a torch housing having a handle region,
   a torch push-button arranged at a bottom of the torch housing below the handle region,
   a pipe bend coupled directly to a first end of the torch housing by a screw connection,
   a wire core coupled to a second end of the torch housing opposite the first end for guiding the welding wire into the torch housing,
   a gas nozzle coupled to the pipe bend, and
   a wire feed unit arranged within the torch housing for conveying the welding wire along a conveying axis,
   said wire feed unit comprising:
   a drive unit arranged upstream of and aligned with the torch push-button, the drive unit having a rotation axis arranged vertically with respect to the conveying axis of the welding wire,
   a drive roller with a rotation axis and
   a counter roller with a rotation axis,
   wherein the wire feed unit has a gear stage and the rotation axis of the drive unit is arranged aligning with the conveying axis of the welding wire,
   wherein the drive unit conveys the melting welding wire to the gas nozzle via the pipe bend, and
   wherein the rotation axis of the drive roller and the rotation axis of the counter roller are arranged laterally offset, with respect to the direction of the conveying axis of the welding wire, and the rotation axis of the counter roller and the rotation axis of the drive unit, when viewed in a plan view of the handheld welding torch, are arranged in a triangle located symmetrically with respect to the conveying axis of the welding wire.

2. The handheld welding torch according to claim 1, wherein the rotation axis of the drive roller and the rotation axis of the counter roller are arranged vertically with respect to the conveying axis of the welding wire.

3. The handheld welding torch according to claim 1, wherein the wire feed unit is arranged outside of the handle region of the torch housing.

4. The handheld welding torch according to claim 1, wherein the conveying axis of the welding wire is arranged above the drive unit and the torch push-button.

5. The handheld welding torch according to claim 1, wherein the drive unit is arranged between a front end of the torch housing and the torch push-button.

6. The handheld welding torch according to claim 1, wherein the drive unit, the rotation axis of the drive roller and the gear stage are designed as a joint unit.

7. The handheld welding torch according to claim 1, wherein the gear stage is designed as a two-staged spur gear.

8. The handheld welding torch according to claim 1, wherein the drive unit is designed as a brushless external-rotor motor.

* * * * *